Patented Oct. 27, 1953

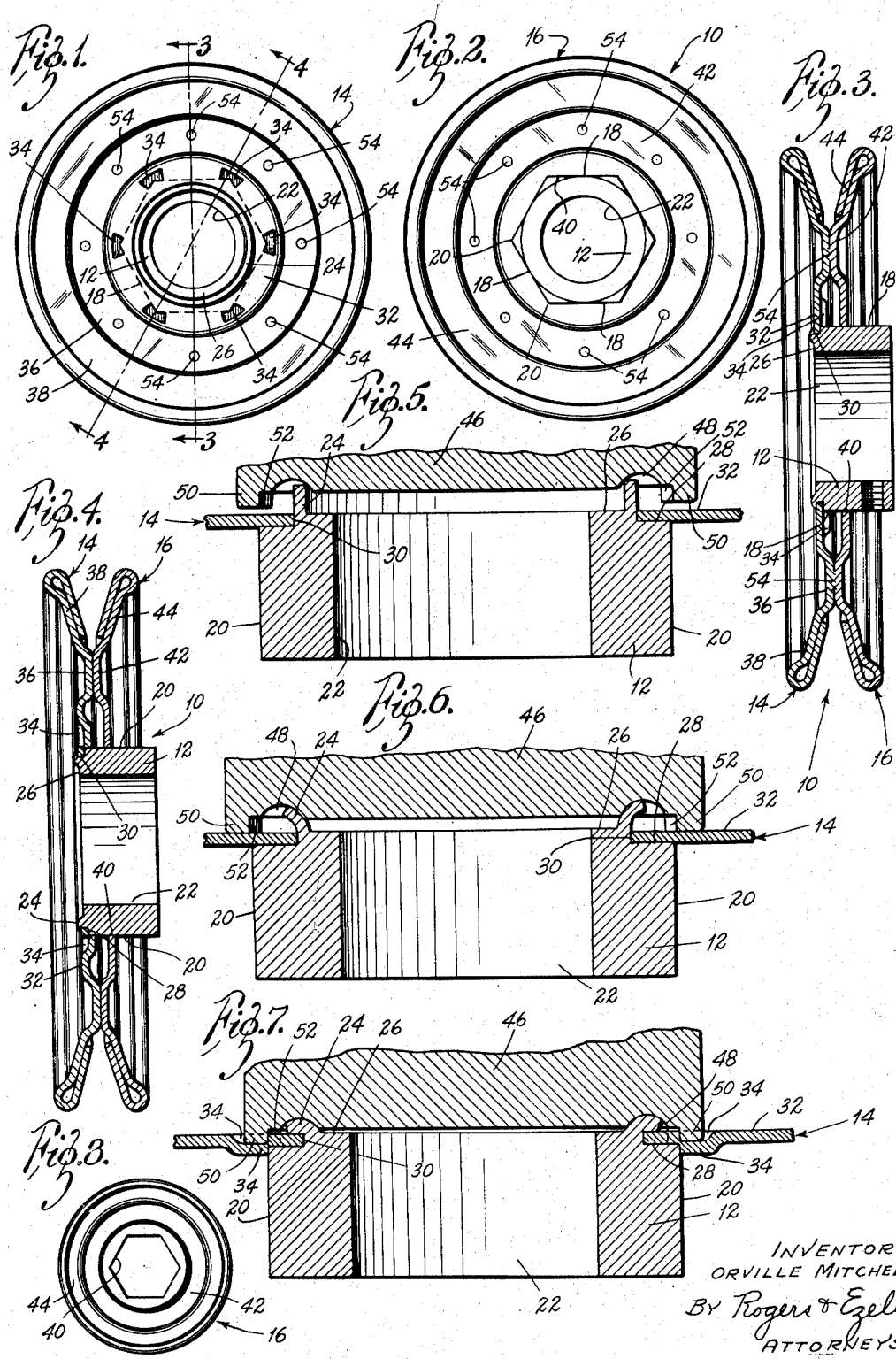

2,656,730

UNITED STATES PATENT OFFICE 2,656,730

PULLEY AND METHOD OF MAKING SAME

Orville Mitchell, Dallas, Tex., assignor to John E. Mitchell Company, Dallas, Tex., a corporation of Missouri Application December 8, 1949, Serial No. 131,809

10 Claims. (Cl. 74—230.8)

The present invention relates generally to a method of fastening a thin plate-like member to a pre-formed hub, and more particularly to a novel pulley and method of making the same.

In one form, the invention comprises positioning a plate-like member adjacent one end of a pre-formed hub and off-setting at least a portion of the plate-like member about the hub and at least partially shearing the inner edge of the offset portion so that the edge is in holding engagement with the side face of the hub. In order to increase the strength of the connection, a longitudinally extending flange may also be provided at the end of the hub and the flange clinched against the outer surface of the plate-like member.

As is well known in this art, it is extremely difficult to fasten a thin plate to a hub in a simple and inexpensive manner whereby the plate will not become loosened on the hub when one is rotated against the restraining action of the other.

It is an object of the present invention, therefore, to provide a novel method of securely fastening a thin plate to a hub without welding them together and without using bolts, keyways, or the like.

Another object is to provide a method of fastening a plate to a hub, utilizing the equipment normally associated with a punch press.

Another object is to provide a method of fastening a plate to a hub by a combination punching and crimping operation.

Another object is to provide a novel pulley by fabricating together a pre-formed hub and a pair of pressed rim members.

Another object is to provide a pulley which has a first rim member fastened to the hub and a second rim member welded to the first rim member.

Further objects and advantages of the present invention will be apparent from the following description, reference being had to the accompanying drawing wherein a preferred embodiment of the present invention is shown, in which:

Fig. 1 is a side elevational view of a pulley made in accordance with the teachings of the present invention;

Fig. 2 is an elevational view of the opposite side of the pulley;

Figs. 3 and 4 are enlarged, vertical, diametrical, sectional views taken on the lines 3—3 and 4—4, respectively, in Fig. 1;

Figs. 5, 6, and 7 are enlarged, fragmentary, diametrical, sectional views taken on the line 4—4 of Fig. 1, showing the steps of fastening one of the pressed rim members to the hub; and Fig. 8 is a reduced side elevational view of the other rim member before it is positioned against the first rim member and fastened thereto.

Although the invention is shown and will be described as applied to a pulley construction, it is to be understood that it is not so limited but can be used for fastening various types of thin members to rigid bodies.

Referring to the drawing more particularly by reference numerals, 10 indicates generally a pulley made in accordance with the teachings of the present invention. It comprises a pre-formed hub 12 and two pressed rim members 14 and 16.

The hub 12 has a hexagonally shaped outer surface containing flat faces 18 which intersect at edges 20. A passageway 22 extends longitudinally through the hub 12.

At one end of the hub 12 there is a longitudinally extending annular flange 24 which separates the end of the hub 12 into an inner shelf 26 and an outer shelf 28.

The pressed rim member 14 is of the configuration shown in Fig. 3 and has a circular opening 30 in the center thereof which is approximately the same size as the outer dimensions of the flange 24. Adjacent the opening 30 there is a flat surface 32 which contains a series of indentations 34 (Fig. 1) adjacent the edges 20 of the hub 12. Contiguous with the flat surface 32 is a portion 36 which is offset inwardly and which leads to a portion 38 which first extends outwardly and then is pressed back upon itself to form one-half of the belt receiving part of the pulley 10.

The pressed rim member 16 (Figs. 3 and 4) is of substantially the same shape as rim member 14. It differs therefrom only in that it contains a hexagonally shaped opening 40 (Fig. 8) at its center which is of a size to receive the hub 12. The rim member 16 also contains an offset portion 42 which abuts the offset portion 36 of the other rim member, and a portion 44 which forms the other half of the belt receiving part of the pulley 10.

In fastening the rim member 14 to the hub 12, a die member 46 (Figs. 5, 6 and 7) is used. This member 46 contains an annular groove 48 of arcuate cross-section in the lower face thereof and six equally spaced stud-like elements 50 depending from the lower face of the member 46 adjacent the outer edge of the groove 48. The stud-like elements 50 have flat lower surfaces and each element contains an obtuse V-shaped notch 52 in the inner face thereof to receive an edge 20 of the hub 12.

To fabricate the pulley 10, the pressed rim member 14 is positioned on the hub 12 so that the flange 24 of the latter protrudes through the circular opening 30 and the flat surface 32 of the rim is against the outer shelf 28 of the hub 12 (Fig. 5). The die member 46 and the assembled rim and hub are then brought together so that the inner edge of the annular groove 48 is in line with the inner edge of the flange 24.

The die member 46 is then moved toward the hub 12, or vice-versa, whereby the free edge of the flange 24 is forced over and outwardly by the inner surface of the groove 48 (Fig. 6).

As the die member 46 continues to move against the hub 12, the stud-like elements 50 impinge upon the flat surface 32 of the rim member 14 adjacent the edges 20 and indent or offset the areas 34 (Fig. 7). The notches 52 in the elements 50 surround the edges 20 of the hub 12.

The inner edges of the indented areas 34, which are adjacent the outer edge of the outer shelf 28 of the hub 12, are thereby partially sheared by the outer edge of the outer shelf 28 so that said inner edges are moved to a position contiguous with the outer face 18 of the hub 12 and in holding engagement therewith. This provides a very tight connection because the offset edges are both in engagement with the faces 18, and also surround the edges 20 as shown in Fig. 1.

The extent of the engagement between the inner edges of the indented areas 34 and the outer faces 18 of the hub is well known to those familiar with ordinary punching operations. Thus, when a punch is used to cut a disc or the like from a plate in an ordinary punching operation, the edges of the plate surrounding the sheared portion cling to the surface of the punch when it is attempted to be withdrawn. Because of this phenomenon it is usually necessary to provide extra means for "stripping" the plate off of the punch.

In the present invention, however, this clinging phenomenon is an asset instead of a hindrance because it provides a simple and very satisfactory means for fastening the members together.

As shown and described, the portions 34 are only partially sheared but it is to be understood that they could also be sheared completely through at the inner edges so as to expose the faces 18 of the hub 12. It is believed, however, that the pulley has a better appearance when the portions 34 are only partially sheared.

At the same time that the portions 34 are being offset, the annular groove 48 in the lower face of the die member 46 clinches the flange 24 tightly against the upper surface of the flat portion 32 of the rim member 14, thereby increasing the strength of the connection between the hub 12 and the rim member 14.

The other rim member 16 (Fig. 8) is then disposed on the hub 12 so that the latter protrudes through the hexagonal shaped opening 40 and the portion 42 abuts the portion 36 of the rim member 14.

The two portions 36 and 42 are then spot welded together at a series of spaced points 54 (Figs. 1 and 2), thereby completing the fabrication of the pulley 10.

It is to be understood that the foregoing description and the accompanying drawing have been given only by way of illustration and example, and that changes and alterations in the present disclosure, which will be readily apparent to one skilled in the art, are contemplated as within the scope of the present invention, which is limited only by the claims which follow.

What is claimed is:

1. The method of making a composite device including two members firmly attached together, comprising the steps of providing a member containing at least two diametrically opposed side faces and an end surface disposed at an angle to said faces; positioning a plate-like member adjacent the end surface; and offsetting portions of the plate-like member adjacent said side faces by at least partially shearing the plate-like member so that the edges of the offset portions bind on said side faces.

2. The method of making a composite device including two members firmly attached together, comprising the steps of providing a member containing a plurality of side faces with adjacent faces intersecting to form edges, and an end surface disposed at an angle to the side faces; positioning a plate-like member adjacent the end surface; and offsetting portions of the plate-like member about at least two of the edges by at least partially shearing the plate-like member so that the edges of the offset portions bind on the side faces about the edges of the side faces.

3. The method of making a composite device including two members firmly attached together, comprising the steps of providing a member containing a plurality of outer side faces with adjacent faces intersecting to form edges, an end surface disposed at an angle to the side faces, and a flange extending in an axial direction outwardly from the end surface; positioning a plate-like member containing an opening of a size to receive the flange adjacent the end surface so that the flange protrudes through said opening; and simultaneously clinching the flange over and against the upper surface of the plate-like member and offsetting portions of the plate-like member about at least two of the edges by at least partially shearing the plate-like member so that the edges of the offset portions bind on the side faces about the edges of the side faces.

4. A device of the type described, comprising a hub-like member having a plurality of side faces with adjacent faces intersecting to form edges, and an end surface disposed at an angle to the side faces; and a plate-like member abutting said end surface and having portions thereof adjacent at least two of said edges offset from the plane of the plate-like member, the inner edges of the offset portions being at least partially sheared and binding on the side faces on both sides of the face edges.

5. A pulley, comprising a hub member having a plurality of side faces with adjacent faces intersecting to form edges, and an end surface disposed at an angle to the side faces; and a rim member abutting said end surface and having portions thereof adjacent each of said edges offset from the plane of the rim member, the inner edges of each of said offset portions being at least partially sheared and binding on the side faces on both sides of the edge of the faces.

6. A pulley, comprising a hub member having a plurality of side faces with adjacent faces intersecting to form edges, an end surface disposed at an angle to the side faces, and an annular flange-like portion extending from said end surface; and a rim member containing a circular opening disposed adjacent said end surface with the flange-like portion extending through said opening, the flange-like portion being clinched against the surface of the rim member opposite to the end surface; the rim member containing a series of offset portions, each of said offset portions being adjacent one of the edges of the faces and having the inner edge thereof at least partially sheared and binding on the side faces on both sides of the edge.

7. A pulley, comprising a hub member having a plurality of side faces with adjacent faces intersecting to form edges, an end surface disposed at an angle to the side faces, and an annular flange-like portion extending from said end surface; a first rim member containing a circular opening disposed adjacent said end surface with the flange-like portion extending through said opening, the flange-like portion being clinched against the surface of the first rim member opposite to the end surface; the first rim member containing a series of offset portions, each of said offset portions being adjacent one of the edges of the faces and having the inner edge thereof at least partially sheared and binding on the side faces on both sides of the edge; and a second rim member containing an opening to receive the hub member disposed on said hub member adjacent the first rim member, the two rim members being fastened together to form the belt-receiving portion of the pulley.

8. The method of making a composite device including two members firmly attached together, comprising the steps of providing a first member containing a face and an end surface intermediate said face and a shoulder, said surface being disposed at an angle to the face to provide a shearing edge; positioning a plate-like member having an opening therein adjacent the end surface with said opening closely fitting against said shoulder; and offsetting a portion of the plate-like member opposite said shoulder and adjacent the face by at least partially shearing the plate-like member over the shearing edge so that an edge of the offset portion binds on said face opposite said shoulder and in the same operation forcing said plate-like member against said end surface.

9. The method of making a composite device including two members firmly attached together, comprising the steps of providing a hub-like member containing a side face, an end surface disposed at an angle to the side face, and a flange extending in an axial direction outwardly from adjacent the end surface; positioning a plate-like member containing an opening of a size to closely receive the flange adjacent the end surface so that the flange protrudes through said opening; and in a single operation clinching the flange over and against the upper surface of the plate-like member, offsetting a portion of the plate-like member adjacent the face of the hub-like member and opposite at least a portion of said flange by at least partially shearing the plate-like member so that an edge of the offset portion binds on said face opposite said clinched-over flange portion, and in said same operation forcing said plate-like member against said end surface to effect an axial binding of said plate-like member against the side face of said hub-like member.

10. A device of the type described, comprising a hub-like member having at least one side face and an end surface intermediate a shoulder, said end surface being disposed at an angle to the side face; and a plate-like member having an opening therein abutting said end surface so that said opening closely fits against said shoulder, said plate-like member having a portion thereof adjacent the side face at least partially sheared and offset from the plane of the plate-like member with the inner edge of the sheared offset portion binding on said side face, said offset portion being opposite at least a portion of said shoulder so that said plate-like member is axially bound on said hub-like member.

ORVILLE MITCHELL.

References Cited in the file of this patent

UNITED STATES PATENTS

| Number | Name | Date |
|--------|------|------|
| 430,000 | Clark | June 10, 1890 |
| 638,470 | Osgood | Dec. 5, 1899 |
| 638,554 | Burton | Dec. 5, 1899 |
| 1,337,808 | Winter | Apr. 20, 1920 |
| 1,466,157 | Byrne et al. | Aug. 28, 1923 |
| 1,591,183 | Reynolds | July 6, 1926 |
| 1,936,909 | MacChesney | Nov. 28, 1933 |
| 1,996,109 | Hiering | Apr. 2, 1935 |
| 2,051,216 | Jones et al. | Aug. 18, 1936 |
| 2,188,953 | Mitchell | Feb. 6, 1940 |
| 2,260,149 | Meek | Oct. 21, 1941 |
| 2,306,389 | Jorgensen | Dec. 29, 1942 |